Figure 1:
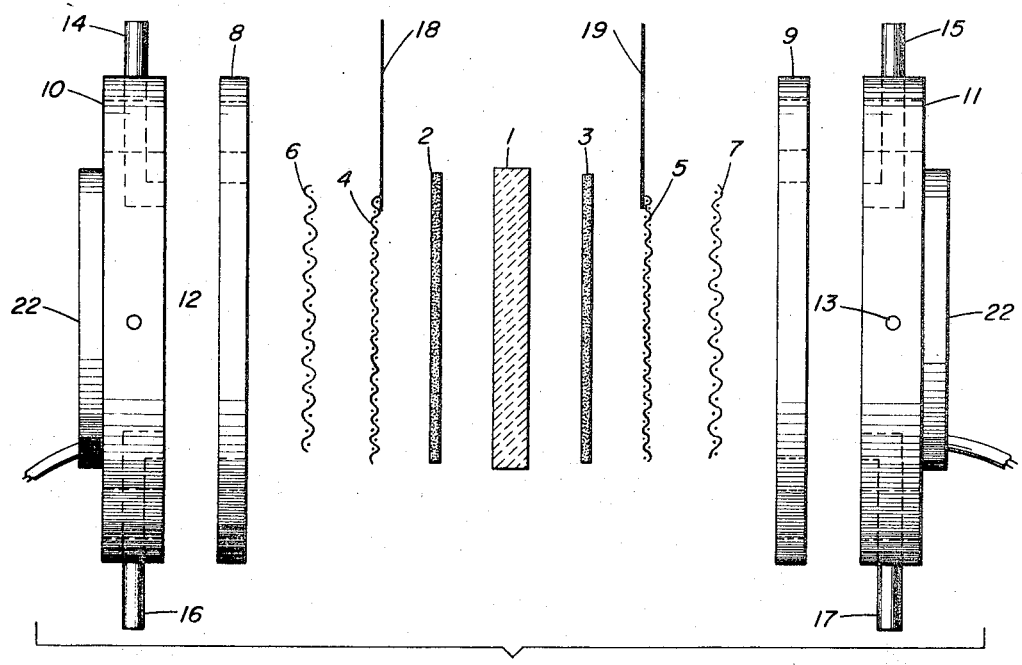

Aug. 29, 1967

W. A. BARBER 3,338,751

METHOD FOR PREPARING ELECTRODE FROM PASTE CONTAINING
NON-NOBLE METAL FORMATE AND MINERAL OIL

Filed April 21, 1965

INVENTOR.
WILLIAM AUSTIN BARBER

BY

ATTORNEY 3,338,751
METHOD FOR PREPARING ELECTRODE FROM PASTE CONTAINING NON-NOBLE METAL FORMATE AND MINERAL OIL
William Austin Barber, Stamford, Conn., assignor to American Cyanamid Company, Stamford, Conn., a corporation of Maine
Filed Apr. 21, 1965, Ser. No. 449,710
7 Claims. (Cl. 136—120)

The present invention relates to a novel procedure for obtaining catalytic electrodes of enhanced performance eminently suitable for use in a variety of typical fuel cells, such as hydrogen-oxygen, hydrogen-air, hydrazine-oxygen or ammonia-oxygen fuel cells, each employing a basic electrolyte. More particularly, it relates to the preparation of a novel catalytic electrode comprising thermally-reduced, substantially-pure non-noble metals, such as nickel or cobalt, useful in typical alkaline-electrolyte fuel cells operative on the fuel side.

It is known that various non-noble metallic catalysts, such as chemically prepared nickel or cobalt, in formed electrodes can be utilized in alkaline or basic fuel cells. Unfortunately, such electrodes cannot be widely used as hydrogen electrodes in that such fuel cells, operating on non-noble electrodes, perform rather poorly with increasing current densities and attendant decrease in voltages. However, to obtain both increased current densities and increased voltages, noble catalysts are employed as hydrogen or fuel electrodes. This use requires relatively large catalyst loadings which undesirably increase the cost of electrode preparation substantially.

It is, therefore, a principal object of the present invention to provide a process for obtaining formed, relatively inexpensive, non-noble fuel electrodes being either unsupported or supported on either a metallic or a non-metallic substrate, which electrodes permit typical basic fuel cells to operate at high voltages, high current densities and at elevated temperatures. A further object is to provide a straightforward method for preparing such enhanced electrodes containing reduced non-noble metals. These and other advantages will become apparent from a consideration of the ensuing detailed description.

To this end, it has been unexpectedly found that electrodes prepared from non-noble metal formates are enhanced to an extent hitherto unknown. Metal formates, when thermally reduced at temperatures at or near their decomposition points, enhance electrodes which incorporate the so-reduced metals. This is in contradistinction to the use of either chemically reduced non-noble metals, such as nickel or cobalt, or chemically extracted non-noble metals from their alloys, such as Raney nickel or Raney cobalt.

According to the process of the invention, the catalyst suitable for use as a fuel electrode for a fuel cell utilizing an alkaline electrolyte can be prepared in an inexpensive, straightforward manner. This can be accomplished by two methods. One involves the decomposition of a non-noble metal formate, such as nickel formate or cobalt formate, and mixtures thereof. However, prior to their decomposition, the metal formates may be combined with a mineral oil and a binder-waterproofing agent in aqueous emulsion form, such as polytetrafluoroethylene, polychlorotrifluoroethylene or polyethylene, to form a paste. This paste is then spread on a suitable surface, such as glass, from which it may be stripped as a sheet, then dried. Resultant sheet is next thermally treated to reduce the metal formate salt to the free metal. Usually, temperatures ranging from about 225° C. to about 350° C. may be employed.

An alternative procedure, and preferred mode of operation, involves the use of a supporting grid or screen which may advantageously be employed to receive the foregoing catalyst mixture or paste prior to drying and thermal reduction. The grid material to be used is chosen for its ability to withstand the corrosive condition which exists in the particular alkaline or basic electrolyte system. Illustrative of a suitable screen or grid is: stainless steel, nickel or asbestos paper. The catalyst paste is spread on the screen and the resultant structure is dried. The latter is then subjected to reduction by thermal decomposition in an inert atmosphere, such as nitrogen or argon, at temperatures between 225° C. and 350° C. for from ten minutes to about two hours. The resultant electrode is cut to any desired shape for use in a fuel cell.

In a fuel cell there is employed, as is known, a matrix or membrane separating the electrodes, one of which is prepared according to the process of this invention. The matrix is saturated with base electrolyte. Ordinary filter paper, asbestos fiber paper as well as polymeric membranes containing commercially available ion exchange materials can be used. The latter material may also be used in either a leached or water-equilibrated state. For illustrative purposes, ordinary filter paper which is saturated with either 5 N or 8 N potassium hydroxide can be employed herein as the matrix or electrode-separating membrane.

In general, hereinbelow defined fuel cells which fall within the purview of the present invention comprise three essential elements: base electrolyte, electrodes or electrocatalysts, one of which comprises the electrode of the present invention, and current collectors. Suitable collectors can be perforated, or corrugated plates or metallic screens and equivalents thereof.

In order to further clarify the invention, these and other embodiments thereof are shown in the accompanying drawing and will be described in detail in conjunction with said drawing.

Figure 2:
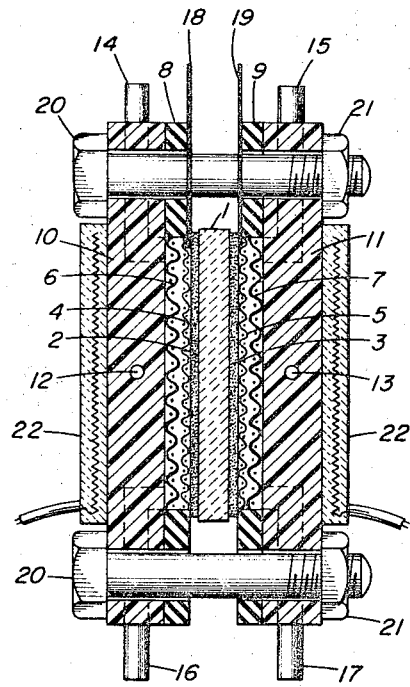

In the drawing:
FIGURE 1 is an exploded plan view, partially in section, of a fuel cell employing the electrode of the present invention, and
FIGURE 2 is a partially expanded side view, partially in section, of the fuel cell of FIGURE 1.

In FIGURE 1, a 5 N potassium hydroxide saturated filter paper membrane 1, is positioned between a fuel electrode 2 of the invention and an oxygen electrode 3, such as platinum, palladium or silver. Abutting the latter electrodes are current collector screens 4 and 5 which comprise nickel or other suitable inert metal. Nickel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as polytetrafluoroethylene or silicone rubber. These seal as well as separate the chambers containing reactants. Exterior to the gaskets are housing members 10 and 11 to which are attached thermocouple 12 and heat control probe 13 and having inlet stainless steel or other inert metal tubing 14 and 15 through which hydrogen and oxygen are separately introduced into the fuel cell. Stainless steel tubing 16 and 17 are provided as vents for unused gases. Wire leads 18 and 19, connected to current collector screens 4 and 5, are the conductive members through which current flows from and to the fuel cell through the external circuit when the fuel cell is in operation. The cell, secured by means of bolts 20 and nuts 21 as shown in FIGURE 2, can be heated, if desired, by an external electrical heating pad 22. The temperature of the cell, determined by the thermocouple 12, is controlled by heat control probe 13.

Electrodes prepared from the non-noble metal salts of formic acids and mixtures of such metal catalysts and their performance are set forth in the following examples which are merely illustrative and not to be taken as limitative of the invention. Further, each of the examples incorporate the fuel cell defined by the above drawing. Unless otherwise stated, the parts are by weight.

*Example 1*

In a suitable vessel are admixed 10 parts of nickel formate, 1.5 parts of polytetrafluoroethylene latex as a 60% emulsion and 3 parts of mineral oil (Fractol A). A green paste is formed. This paste is then spread on a 100 mesh nickel metal screen to obtain a nickel formate concentration of about 125 milligrams per square centimeter. After formation and drying, this electrode is cleaned in denatured alcohol and dried at room temperature to obtain a green electrode sheet. An electrode disc is cut from this sheet and heated at about 310° C. under a nitrogen atmosphere to decompose the nickel formate. The over-all color of the electrode prior to decomposition is green. After the decomposition is effectuated, a black color is noted.

Resultant black electrode disc, which on analysis contains 40 milligrams of nickel per square centimeter, is next assembled as the hydrogen electrode (i.e., the fuel side electrode) while employing a platinum electrode which contains 9 milligrams per square centimeter as the oxygen electrode and 5 N KOH as the electrolyte. The cell is heated to 125° C. and an open circuit voltage of 1.05 volts is measured. Under a current drain of 200 milliamperes per square centimeter, a measured voltage of 0.80 volt is observed.

*Example 2*

In lieu of nickel formate, cobalt formate is employed following the procedure of Example 1 in preparing a pink electrode which is also thermally decomposed at about 310° C. for about 30 minutes. A black electrode results. When tested in the cell of Example 1 operated at 85° C., a potential of 0.75 volt is obtained at 180 milliamperes per square centimeter.

*Example 3*

The procedure of Example 1 is repeated in every detail except that the electrode is tested in the cell maintained at 85° C. A potential of 0.73 volt is obtained at 180 milliamperes per square centimeter.

*Example 4*

Repeating the procedure of Example 3 in every detail except that the cell is operated at 100° C., there is noted a potential of 0.80 volt at 180 milliamperes per square centimeter.

The following examples illustrate the poor performance of electrodes prepared by either chemical reduction or extraction techniques.

*Example 5*

An electrode is made with chemically reduced nickel by reducing nickel chloride in aqueous suspension with sodium borohydride to form a black precipitate of nickel. This is washed, partly dried, and mixed with mineral oil and polytetrafluoroethylene latex emulsion (60% solids) to form a paste as in Example 1. The resulting paste is spread on a nickel metal screen to obtain a nickel concentration of 40 mg./cm.$^2$. This structure is next dried, washed with denatured alcohol and tested as the electrode in Example 3 at 85° C. A current of 180 milliamperes per square centimeter is not attainable.

*Example 6*

An electrode is made from Raney nickel by caustic leaching of aluminum from Raney alloy until no further leaching occurs. The Raney nickel is washed, partly dried, mixed with mineral oil and polytetrafluoroethylene latex emulsion (60% solids) to form a paste as in Example 1. The resulting paste is spread on a nickel metal screen to obtain a nickel concentration of 40 mg./cm.$^2$. The electrode is dried at room temperature, washed with denatured alcohol and tested as in Example 3. At 85° C., a current of 180 milliamperes per square centimeter could not be attained.

I claim:
1. In a process for preparing a catalytic electrode adapted for use in a fuel cell operative on the fuel side when employing an alkaline electrolyte, the improvement which consists essentially of: admixing a non-noble metal salt of formic acid, mineral oil and an aqueous emulsion of a water-binding agent whereby a paste is formed, spreading said paste on a surface to form a sheet, drying the latter, heating said sheet in an inert atmosphere to a temperature sufficient to reduce the said metal salt to the free metal, and thereafter recovering an enhanced electrode structure.

2. The process of claim 1 wherein the non-noble metal salt is nickel formate.

3. The process of claim 1 wherein the non-noble metal salt is cobalt formate.

4. The process of claim 1 wherein the said paste is applied to a suitable substrate prior to drying.

5. The process of claim 4 wherein the substrate is a nickel screen.

6. In a process for preparing a catalytic electrode adapted for use in a fuel cell operative on the fuel side when employing an alkaline electrolyte, the improvement which consists essentially in: admixing a non-noble metal salt of formic acid, mineral oil and an aqueous emulsion of a water-binding agent whereby a paste is formed, spreading said paste on a strippable surface to form a sheet, stripping said sheet from said surface, heating said sheet in an inert atmosphere to a temperature sufficient to reduce the said metal salt to the free metal, and thereafter recovering an enhanced electrode structure.

7. The process of claim 6 wherein the said paste is applied to a glass surface.

References Cited
UNITED STATES PATENTS

| | | | |
|---|---|---|---|
| 2,880,257 | 3/1959 | Murphy et al. | 136—29 |
| 3,041,388 | 6/1962 | Fukuda et al. | 136—24 |
| 3,068,310 | 12/1962 | Casey et al. | 136—29 |
| 3,160,526 | 12/1964 | Ruetschi | 136—24 |
| 3,212,937 | 10/1965 | Talvenheimo | 136—122 |

WINSTON A. DOUGLAS, *Primary Examiner.*

A. SKAPARS, *Assistant Examiner.*